United States Patent [19]

Patterson et al.

[11] Patent Number: 5,662,167
[45] Date of Patent: Sep. 2, 1997

[54] OIL PRODUCTION AND DESANDING METHOD AND APPARATUS

[75] Inventors: John C. Patterson, Garland; Harry T. Hong, Plano, both of Tex.

[73] Assignee: Atlantic Richfield Company, Los Angeles, Calif.

[21] Appl. No.: 617,159

[22] Filed: Mar. 18, 1996

[51] Int. Cl.$^6$ ..................................... E21B 43/38
[52] U.S. Cl. ................. 166/265; 166/105.1; 166/105.5
[58] Field of Search ..................... 166/276, 265, 166/278, 75.12, 105.2, 105.1, 105.3, 105.4, 105.5

[56] References Cited

U.S. PATENT DOCUMENTS

| | | | |
|---|---|---|---|
| 1,548,803 | 8/1925 | Cotton | 166/105.1 |
| 2,104,339 | 1/1938 | Arutunoff | 166/105.1 |
| 2,810,352 | 10/1957 | Tumlison | 166/105.5 |
| 4,148,735 | 4/1979 | Laval, Jr. | 166/105.1 X |
| 4,407,360 | 10/1983 | Hamrick | 166/105.4 X |
| 5,295,537 | 3/1994 | Trainer | 166/105.3 X |
| 5,314,018 | 5/1994 | Cobb | 166/105.1 X |

Primary Examiner—Frank Tsay
Attorney, Agent, or Firm—F. Lindsey Scott

[57] ABSTRACT

A method and apparatus for desanding oil produced from a subterranean oil-bearing formation through a wellbore, the method comprising: flowing oil from the oil-bearing formation upwardly through a first tubing at a velocity sufficient to carry sand entrained in the oil upwardly through the first tubing; flowing the oil from the first tubing upwardly through a larger tubular section at a velocity sufficient to carry sand entrained in the oil upwardly to a perforated section positioned in a second tubing in the larger tubular section, the perforated section being positioned near the upper end of the larger tubular section; passing the oil through the perforated section and through a circumferential path around a dip tube positioned beneath the perforated section to centrifugally separate sand from the oil so that the sand is passed outwardly toward an inner diameter of the second tubing and downwardly to storage in a lower portion of the second tubing; and flowing the oil upwardly through the dip tube to a pump and through the pump and a third tubing to oil recovery at the surface.

13 Claims, 2 Drawing Sheets

OIL PRODUCTION AND DESANDING METHOD AND APPARATUS

BACKGROUND OF THE INVENTION

1. Field of the Invention

This invention relates to a method and an apparatus for producing and desanding crude oil by separating at least a portion of the sand produced with the crude oil from a producing interval (zone) penetrated by a wellbore prior to pumping the crude oil to the surface.

2. Brief Description of the Prior Art

Many times in gravel pack completions or other completions wherein sand is produced with the oil, the oil and entrained sand flow into the wellbore. The upward velocity of the oil in the wellbore is relatively low and the sand may settle out and eventually restrict production by covering all or portions of the productive interval. The resultant necessity for workovers requires additional equipment to circulate out the sand and may also cause fluid losses and possible damage to the producing formation. To prevent the accumulation of sand in the producing zone, completions have been used where the oil is drawn directly from the producing interval into a tubing string through which it is pumped, at a velocity sufficient to entrain the sand, directly to the surface. The pump is frequently at a substantial distance above the bottom of the tubing string, particularly in high production wells where the liquid level in the wellbore is relatively high. In such completions, both the oil and the sand are pumped to the surface. The tubing is typically sized so that the flow rate through the tubing is sufficiently high to maintain the sand in suspension as the crude oil is drawn into the tubing and pumped to the surface. Liquid velocities of about 0.5 ft./sec. are generally considered sufficient to maintain the sand in suspension in the produced liquids, i.e. crude oil, water and mixtures thereof.

Such completions result in the removal of at least a substantial portion of the entrained sand from the well. While such completions are effective to remove sand from the well, the mixture of sand and crude oil is abrasive and pumping this mixture results in a relatively short pump life. When gas is produced with the sand and crude oil, the presence of the gas results in reduced pump efficiency so that not only is the pump life short but the pump efficiency is relatively low.

Accordingly, a method and apparatus for removing sand from a sand/crude oil mixture produced from a subterranean producing zone prior to pumping the crude oil to the surface, has been sought.

SUMMARY OF THE INVENTION

According to the present invention, a sand collection and oil production apparatus for producing oil from a subterranean oil-bearing formation penetrated by a wellbore is provided, the apparatus comprises:

a) a first tubing having its first end adapted to receive a flow of oil from the oil-bearing formation;

b) a larger tubular section joined to and having its first end positioned in fluid communication with a second end of the first robing and its second end in fluid communication with the wellbore;

c) a second robing positioned in the larger tubular section and having its first end dosed and its second end in fluid communication with a pump positioned in fluid communication with a first end of a third tubing;

d) a perforated section in the second tubing near the second end of the larger tubular section;

e) a dip tube positioned in the second tubing with its first end extending below the perforated section and in fluid communication with the interior of the second tubing and its second end in fluid communication with the interior of the second tubing above a seal positioned in the second tubing between the perforated section and the second end of the second tubing to close the annular space between an inner diameter of the second tubing and an outer diameter of the dip tube; and, f) an auger positioned around the outer diameter of the dip tube between the perforated section and the first end of the dip tube.

The present invention also comprises a method for desanding oil produced from a subterranean formation through a wellbore wherein the method comprises:

a) flowing oil from the oil-bearing formation upwardly through a first tubing at a velocity sufficient to carry sand entrained in the oil upwardly through the first tubing;

b) flowing the oil from the first tubing upwardly through a larger tubular section at a velocity sufficient to carry sand entrained in the oil upwardly to a perforated section positioned in a second tubing in the larger tubular section, the perforated section being positioned near the upper end of the larger tubular section;

c) passing the oil through the perforated section and through a circumferential path around a dip tube positioned beneath the perforated section to centrifugally separate sand from the oil so that the sand is passed outwardly toward an inner diameter of the second tubing and downwardly to storage in a lower portion of the second tubing; and d) flowing the oil upwardly through the dip tube to a pump and through the pump and a third tubing to oil recovery at the surface.

DESCRIPTION OF THE PREFERRED EMBODIMENTS

In the discussion of the Figures, the same numbers are used to refer to the same or corresponding elements in all of the Figures.

Figure 1:
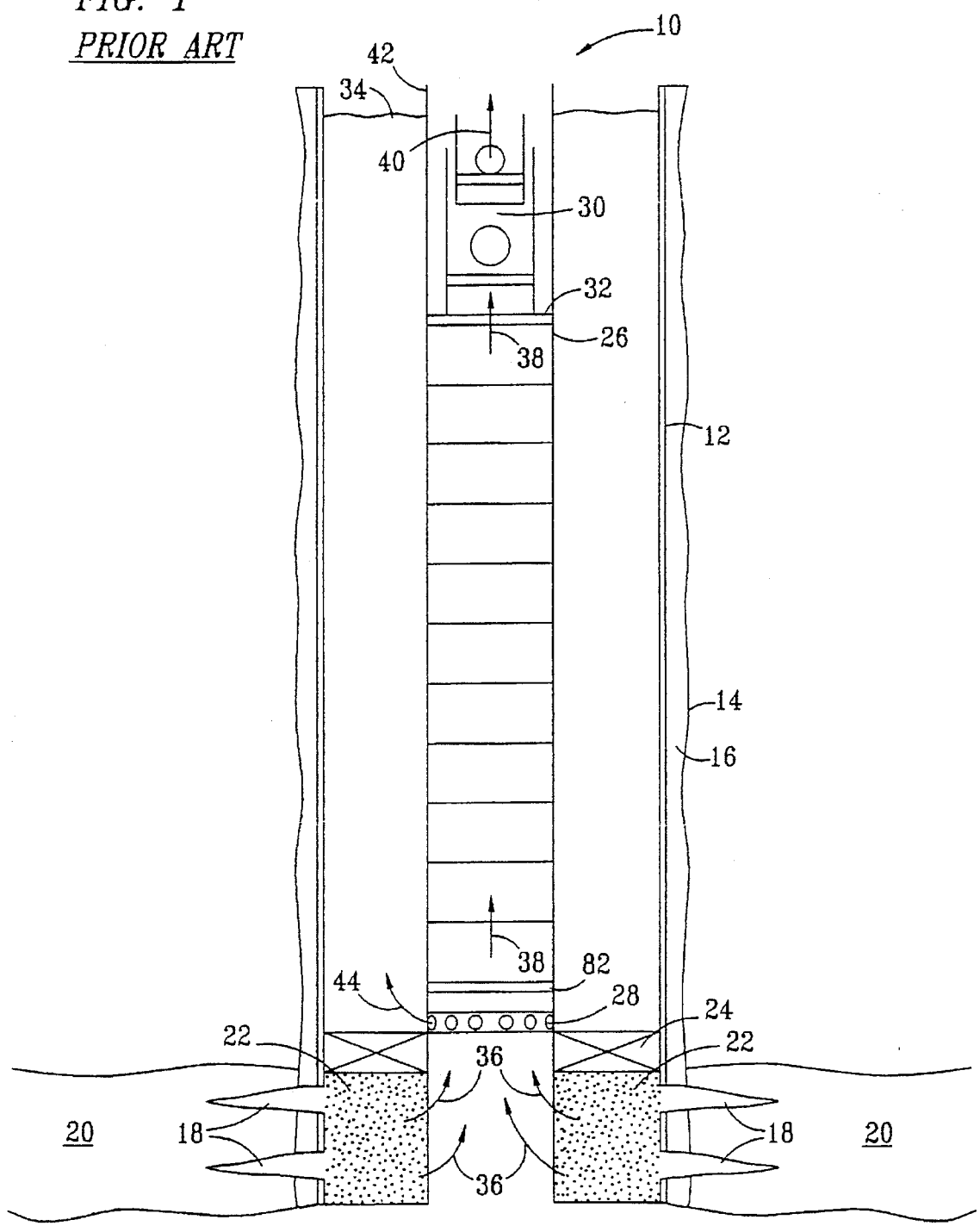
FIG. 1 is a schematic diagram of a prior art apparatus for producing crude oil from a subterranean formation so that sand produced from the formation with the crude oil is entrained with the crude oil and pumped to the surface.

In FIG. 1, a well completion apparatus 10 for producing crude oil and entrained sand from a subterranean formation 20 is shown. The apparatus comprises a casing 12 cemented in a wellbore 14 by cement 16. The casing 12, as shown, has been penetrated by perforations 18 so that fluid communication is accomplished into the subterranean oil-bearing formation 20. A gravel pack 22 is positioned over the formation 20 and the casing 12 to restrict or prevent the flow of sand from the formation 20 into the wellbore 14. The gravel pack 22 is maintained in position by a packer 24, which is positioned in the casing 12 above the gravel pack 22. The packer 24 is connected to a tubing 26 and includes a perforated section 28 through which oil passes into the annulus between the tubing 26 and the casing 12. The oil passing through the perforated section 28, as shown by an arrow 44, maintains the liquid in the annular space at a liquid level 34. A pump 30 is positioned slightly below the liquid level 34 in a tubing 42. The pump 30 can be of any suitable type such as a tube pump or an insert pump, as known to those skilled in the art. As the system is operated, oil flows from the oil-bearing formation 20 through perforations 18 and the gravel pack 22, as shown by arrows 36, and then upwardly through the tubing 26, as shown by arrows 38, to the pump 30 and from the pump 30 upwardly through the tubing 42, as shown by an arrow 40. The tubing 42 is in fluid communication with the surface and the oil is produced through the tubing 42, as known to those skilled in the art. The liquid flow rate through the tubing 26 and the tubing 42 is maintained at a rate sufficient to maintain sand produced with the oil from the formation 20 in suspension in the produced liquids, i.e. oil, water or oil/water mixtures.

Figure 2:
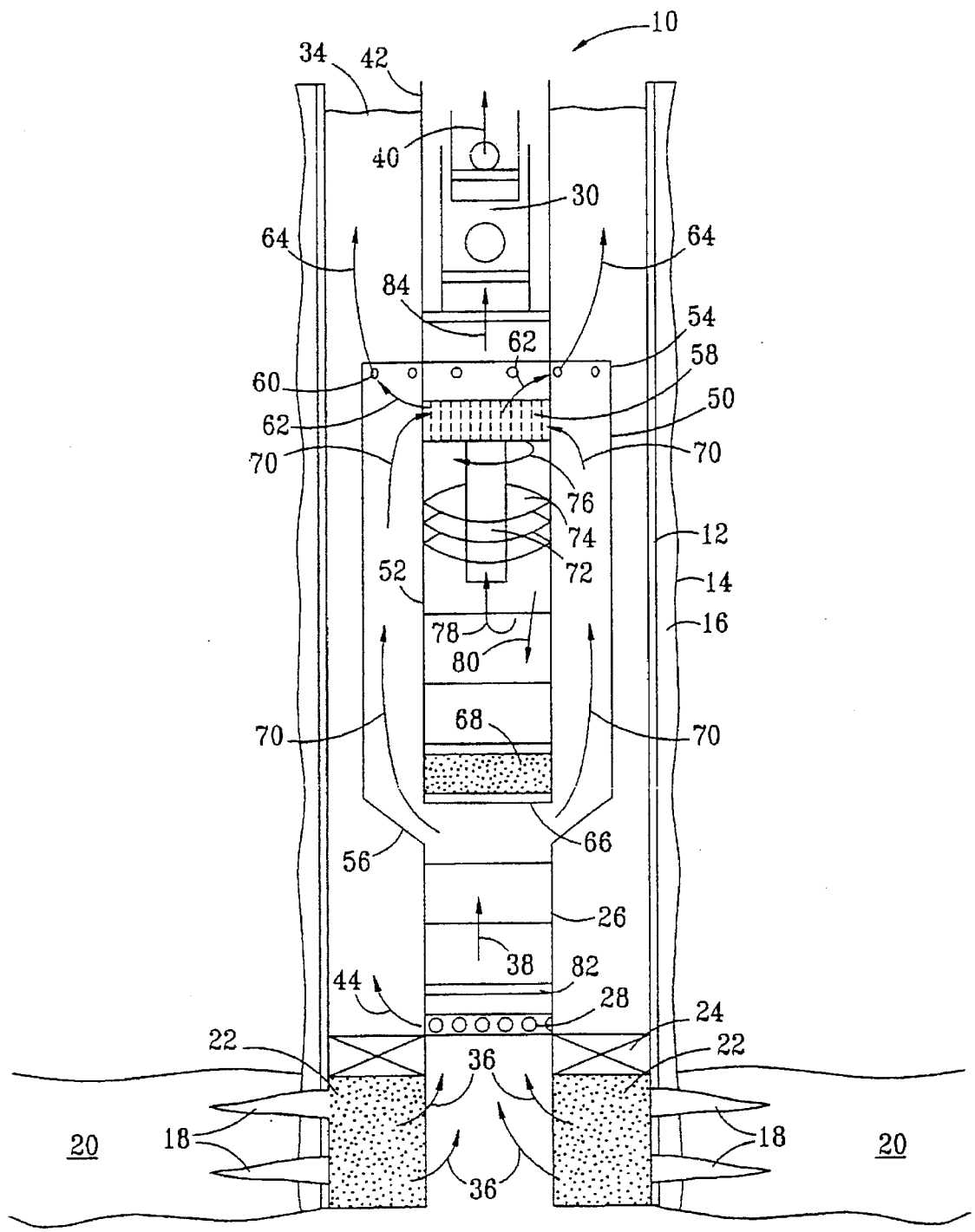
FIG. 2 is a schematic diagram of an embodiment of the apparatus of the present invention.

An apparatus for the recovery of oil from such formations according to the present invention is shown in FIG. 2. In FIG. 2, the oil containing sand and possibly gas, water and the like flows from the formation 20, through the perforations 18 and gravel pack 22, as shown by the arrows 36, and then through the tubing 26, as shown by the arrow 38. The oil passes upwardly through the tubing 26 into a larger tubular section 50 which may comprise a section of casing smaller than the casing 12, a larger tubing section or the like, as known to those skilled in the art. The larger tubular section 50 is joined to the tubing 26, as shown. The larger tubular section 50 desirably has a closed top 54 with perforations 60 for the escape of gas. A tubing 52 is positioned to extend through the top 54 of the tubular section 50 and extends to near a bottom 56 of the tubular section 50. The tubing 52 includes a perforated section 58 near the top 54 of the tubular section 50. Desirably, the perforated section 58 is no more than two, and is preferably no more than one, tubing 52 diameters below the top 54 of the tubular section 50. The perforations 60 are positioned in the tubular section 50 on the sides or the top 54 of the tubular section 50. These perforations permit the escape of gas separated from the crude oil in the tubular section 50, as shown by arrows 62 and 64. The gas tends to be separated as the oil flows through the perforated section 58 into the interior of the tubing 52 and as the pressure of the fluid is reduced. The tubing 52 is closed at its bottom 66 for the accumulation of sand 68, as will be discussed hereinafter. Flow through the tubular section 50 to the perforated section 58 is shown by arrows 70. A dip tube 72 is positioned in the tubing 52 and extends below the perforated section 50 toward the bottom 66 of the tubing 52. The dip tube 72 includes a seal or the like between the outer diameter of the dip tube 72 and the inner diameter of the tubing 52 above the perforated section 58, so that fluid communication between the interior of the tubing 52 below the perforated section 58 and the interior of the tubing 52 above the perforated section 58 is through the dip tube 72. An auger 74 is positioned between the outer diameter of the dip tube 74 and the inner diameter of the tubing 52. It may be supported by either surface or both and is positioned to impart a swirling motion to the oil entering the tubing 52 through the perforated section 58, as shown by an arrow 76. This swirling motion pushes the sand outwardly toward the inner diameter of the tubing 52 where it fails, as shown by an arrow 80, to the bottom 66 of the tubing 52. The oil is centrally withdrawn through the dip tube 72, as shown by an arrow 78. It will be understood that the tubing 52, while shown as centrally located in the tubular section 50, could be eccentrically located, and in some instances such may be desirable to facilitate the separation of gas. The oil withdrawn from the tubing 52, as shown by the arrow 78, passes upwardly through the dip tube 72 and into the upper portion of tubing 52 from which it is withdrawn to the pump 30, as shown by an arrow 84, and then passed to the tubing section 42, as shown by the arrow 40, through which it is passed to the surface for recovery.

In many fields, oil is maintained at a relatively high liquid level in the well during production. In such wells which have relatively high oil flow rates, sand may be produced with the oil from the formation even through a gravel pack. In the event the gravel pack should fail, sand may be produced directly with the oil. Certain unconsolidated formations may produce sand with the crude oil in quantities which are not sufficient to warrant the positioning of a gravel pack and the like. As discussed previously, when oil is produced from formations which produce oil/sand mixtures, pumping the oil/sand mixture is detrimental to the pump. As a result, the pumps require frequent replacement with the resulting shut down, expense for replacement, and the like. According to the present invention, the sand is removed from the oil prior to pumping. While the drawing is not to scale, it should be appreciated that the length of the tubing 52 beneath the top of the tubular section 50 could be 400–500 feet or more. The amount of space between the producing formation and the top of the liquid level will determine the available length of the tubing 52 usable for sand storage space.

When it is necessary to remove the apparatus for any reason, such may be readily accomplished by the use of a tubing release fitting 82 positioned directly above the packer 22. Such release joints are well known to those skilled in the art and will not be discussed in detail. Similarly, the pump 30 and the tubing 52 including the dip tube 72 may be coupled to the tubular section 50 for decoupling and removal separately. In such an instance, the tubular section 50 remains in the well while the remaining components of the apparatus may be removed for replacement of the pump 30; removal of the sand 68, and the like.

In the operation of the apparatus of the present invention, oil is produced, as shown by the arrows 36, flows upwardly through the tubing 26, as shown by the arrow 38, the lower portion of the tubular section 50, as shown by the arrows 70, and into the tubing 52 through the perforated section 58. Gas is separated from the oil during its residence time in the tubular section 50 and is recovered through the perforations 60, as shown by the arrows 64. The gas rises through the annular space between the outer diameter of the tubing 42 and the inner diameter of the ceasing 12 for separate recovery. The removal of the gas improves the pumping efficiency of the pump 30. The tubing 26 and the tubular section 50 are sized and positioned to maintain a liquid flow rate upwardly in the apparatus sufficient to retain entrained sand in suspension. A liquid flow rate of about 0.5 foot per second or greater is generally required. The oil which passes through the perforated section 58 is passed through a circular path to centrifugally urge the sand to the outer portion of the auger and toward the inner wall of the tubing 52. The sand then falls to accumulate in the bottom 66 of the tubing 52. The tubing 52, as discussed previously, can be of a substantial length and can accumulate sand for an extended period of time before it requires removal and emptying. The oil is then passed through the dip tube 72 and upwardly through the pump 30 and tubing 42 to the surface.

When the production of oil from such formations is accomplished by an open-ended tube or pump positioned beneath the liquid level in an open well, the sand can accumulate in the wellbore and in the producing formation. Such accumulations can eventually reduce or stop the flow of oil from the producing formation. The sand in such instances can accumulate because the upward velocity in the larger cross-sectional area of the casing is too low to retain the sand in suspension.

In the present invention, some sand may accumulate in the casing outside the perforated section 28 over time. This accumulation of sand above the packer 24 is not considered to be detrimental. While not shown in the drawings, the well 14 may extend through the producing oil-bearing formation 20. In such instances, it is likely that sand may accumulate in the lower portions of the well, but so long as no sand accumulation occurs in the producing interval, sand accumulation in the lower portions of the well is not considered to be detrimental.

The apparatus of the present invention may be fabricated, using well-known oil field components and equipment and normal materials of construction for the particular sand/oil/water/gas mixture being produced from the particular formation. Such materials are considered to be well-known to those skilled in the art.

The method and apparatus of the present invention remove oil containing suspended sand from the producing zone of the formation at a rate sufficient to maintain the sand in suspension in the oil and prevent accumulation of the sand in the producing zone and removed sand and gas from the oil prior to pumping the oil to the surface so that pump life is extended.

Having thus described the present invention by reference to certain of its preferred embodiments, it is respectfully pointed out that the embodiments described are illustrative rather than limiting in nature and that many variations and modifications are possible within the scope of the present invention.

Having thus described the invention, we claim:

1. A sand collection and oil production apparatus for producing oil from a subterranean oil-bearing formation penetrated by a wellbore, the apparatus comprising:
   a) a first tubing having its first end adapted to receive a flow of oil from the oil-bearing formation;
   b) a larger tubular section joined to and having its first end positioned in fluid communication with a second end of the first tubing and its second end in fluid communication with the wellbore;
   c) a second tubing positioned in the larger tubular section and having its first end closed and its second end in fluid communication with a pump positioned in fluid communication with a first end of a third tubing;
   d) a perforated section in the second tubing near the second end of the larger tubular section;
   e) a dip tube positioned in the second tubing with its first end extending below the perforated section and in fluid communication with the interior of the second tubing and its second end in fluid communication with the interior of the second tubing above a seal positioned in the second tubing between the perforated section and the second end of the second tubing to close the annular space between an inner diameter of the second tubing and an outer diameter of the dip tube; and,
   f) an auger positioned around the outer diameter of the dip tube between the perforated section and the first end of the dip tube.

2. The apparatus of claim 1 wherein the auger is positioned on the outer diameter of the dip tube.

3. The apparatus of claim 1 wherein the first end of the first tubing is removably connected to a gravel pack packer.

4. The apparatus of claim 1 wherein the pump is an insert pump.

5. The apparatus of claim 1 wherein the pump is a tubing pump.

6. The apparatus of claim 1 wherein the pump and dip tube are concentrically positioned relative to the large tubular section.

7. The apparatus of claim 6 wherein the pump and the dip tube are removably positioned in the apparatus.

8. The apparatus of claim 1 wherein the pump and the dip tube are eccentrically positioned relative to the larger tubular section.

9. The apparatus of claim 8 wherein the larger tubular section has its second end in fluid communication with the wellbore via perforations through the second end of the larger tubular section.

10. A method for desanding oil produced from a subterranean oil-bearing formation through a wellbore, the method comprising:
    a) flowing oil from the oil-bearing formation upwardly through a first tubing at a velocity sufficient to carry sand entrained in the oil upwardly through the first tubing;
    b) flowing the oil from the first tubing upwardly through a larger tubular section at a velocity sufficient to carry sand entrained in the oil upwardly to a perforated section positioned in a second tubing in the larger tubular section, the perforated section being positioned near the upper end of the larger tubular section,
    c) passing the oil through the perforated section and through a circumferential path around a dip tube positioned beneath the perforated section to centrifugally separate sand from the oil so that the sand is passed outwardly toward an inner diameter of the second tubing and downwardly to storage in a lower portion of the second tubing; and,
    d) flowing the oil upwardly through the dip tube to a pump and through the pump and a third tubing to oil recovery at the surface.

11. The method of claim 10 wherein the oil is degassed by separating gas from the oil in the larger tubular section and recovering the gas through the wellbore outside the third tubing.

12. The method of claim 10 wherein the wellbore is a cased wellbore.

13. The method of claim 10 wherein the oil flows from the oil-bearing formation through a gravel pack.

* * * * *